United States Patent
Murphy

(10) Patent No.: US 6,888,090 B2
(45) Date of Patent: May 3, 2005

(54) ELECTRON BEAM WELDING METHOD

(75) Inventor: John Thomas Murphy, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 141 days.

(21) Appl. No.: 10/338,349

(22) Filed: Jan. 7, 2003

(65) Prior Publication Data

US 2004/0129686 A1 Jul. 8, 2004

(51) Int. Cl.[7] ............................................. B23K 15/00
(52) U.S. Cl. ............................ 219/121.14; 219/121.25; 219/121.28
(58) Field of Search ................. 219/121.12, 121.13, 219/121.14, 121.25, 121.26, 121.28, 121.35

(56) References Cited

U.S. PATENT DOCUMENTS

| | | | | |
|---|---|---|---|---|
| 4,223,199 A | * | 9/1980 | Steigerwald et al. ... | 219/121.35 |
| 4,223,200 A | * | 9/1980 | Moench et al. ......... | 219/121.12 |
| 4,271,348 A | * | 6/1981 | Nakazaki et al. ...... | 219/121.14 |
| 4,321,453 A | * | 3/1982 | Terai et al. ............ | 219/121.14 |
| 4,673,794 A | * | 6/1987 | Irie et al. ............... | 219/121.14 |
| 4,761,536 A | * | 8/1988 | Blakeley ................. | 219/123 |
| 6,023,043 A | * | 2/2000 | Manabe et al. ......... | 219/123 |

FOREIGN PATENT DOCUMENTS

JP 56077083 A * 6/1981

* cited by examiner

*Primary Examiner*—Samuel M. Heinrich
(74) *Attorney, Agent, or Firm*—Ernest Cusick; Gary M. Hartman; Domenica N. S. Hartman

(57) ABSTRACT

A method of forming a welded component by electron beam welding, and the resulting welded assembly. The method is particularly directed to the welding of a component whose subcomponents are formed of dissimilar metals, with the result that an electron beam used to weld the subcomponents is prone to being deflected away from the contact surface interface between the subcomponents and into one of the subcomponents as it passes through the interface. The method is also suitable for welding applications in which the interface between the subcomponents has an arcuate shape. The method involves magnetically steering the electron beam so that the beam is caused to follow the desired path through the interface.

26 Claims, 2 Drawing Sheets

ELECTRON BEAM WELDING METHOD

CROSS REFERENCE TO RELATED APPLICATIONS

Not applicable.

STATEMENT REGARDING FEDERALLY SPONSORED RESEARCH

Not applicable.

BACKGROUND OF THE INVENTION (1) Field of the Invention

The present invention generally relates to methods for welding metal alloys. More particularly, this invention relates to a method of electron beam (EB) welding a joint between articles formed of dissimilar metal alloys, as well as to a method of electron beam welding an arcuate contact surface interface between articles.

(2) Description of the Related Art

Various high-temperature alloys are widely used to form hot section components of turbines, including turbine vanes (nozzles) and blades (buckets) of gas and steam turbines. Circumstances exist where such components are preferably or necessarily fabricated by welding. For example, components having complex configurations, such as steam turbine nozzle assemblies (boxes), can be more readily fabricated by welding castings together. Various welding techniques have been developed for this purpose. Tungsten inert gas (TIG) and plasma transferred arc (PTA) techniques are widely used in manual welding operations. For more demanding applications, such as weld joints having high aspect ratios, laser beam and electron beam welding processes have been developed.

As known in the art, electron beam welding involves directing a beam of high-energy electrons on a joint between articles held in a vacuum. Electron beam welding techniques are particularly well suited for producing weld joints having high aspect ratios, as electron beam welding yields the deepest penetrations of any beam process, e.g., on the order of about four inches (about ten centimeters) and greater, with very high aspect ratios of about ten to fifty being readily achieved. However, when electron beam welding articles formed of dissimilar metals and requiring a relatively deep weld joint, a frequently encountered problem is that the beam will "hook" at the bottom of the weld, curving over into one of the articles and missing the joint, yielding a lack-of-fusion (LOF) defect. As an example, a hooked weld joint may result when welding turbine stator vane assemblies whose vanes are welded to inner and outer bands. Such a situation is schematically represented in FIG. 1, in which an electron beam gun 22 is represented as projecting an electron beam 20 onto a contact interface 14 between two components 10 and 12 formed of dissimilar metals. The weld joint 16 formed by the electron beam 20 can be seen to curve into the lefthand component 10, forming what can be termed a hook 24. As a result of the hook 24, the resulting weld joint 16 is incomplete, yielding a lack-of-fusion defect 18 at the extremity of the contact interface 14 opposite the gun 22. The cause of this hook 24 has been debated. Possible causes include a thermal electromotive force (emf) effect, or an electronegativity difference in the dissimilar metals.

Intuitive approaches to correcting this problem, such as biasing the articles 10 and 12 under the beam 20 or orienting the contact interface 14 at an angle to the beam 20, have proven ineffective because as the interface 14 moves, so does the electron beam 20. Relatively minor stray magnetic fields that may be present as a result of using magnetic fixtures or residual magnetism in machined parts are also known to cause significant beam movement. As a result, such parts are frequently checked with a gauss meter and degaussed if required prior to welding. However, such measures are insufficient to eliminate the beam hook 24 represented in FIG. 1.

In view of the above, it would be desirable if the hooking of an electron beam when welding dissimilar metals could be eliminated, allowing for electron beam welding of a greater variety of components that require deep weld joints with high aspect ratios.

BRIEF SUMMARY OF THE INVENTION

The present invention provides a method of forming a welded assembly by electron beam welding, and the resulting welded assembly. The method is particularly directed to the welding of an assembly whose subcomponents are formed of dissimilar metals, with the result that the electron beam is prone to being deflected away from the contact surface interface between the subcomponents as it passes through the contact surface interface. The method involves magnetically steering the electron beam, so that the beam is caused to follow a desired path through the contact surface interface.

The electron beam welding method of this invention generally comprises placing together two or more articles to define at least one contact surface interface therebetween. A local magnetic field is then applied to at least a portion of the contact surface interface, and an electron beam is then directed at the contact surface interface to electron beam weld the articles together at the contact surface interface, yielding a welded component. The local magnetic field is applied in such a way as to steer the electron beam as it passes through the contact surface interface so that the articles are welded together over the entire contact surface interface.

According to one aspect of the invention, the contact surface interface between the articles is rectilinear, and the local magnetic field is applied in such a way as to straighten the electron beam as it passes through the contact surface interface. This method is applicable when the articles are formed of dissimilar metals, and the dissimilarity of the metals is such that, in the absence of the local magnetic field, the electron beam directed at the contact surface interface would be deflected away from the contact surface interface and into one of the articles. The local magnetic field is then applied in such a way as to straighten the electron beam as it passes through the contact surface interface, so that the articles are welded together over the entire rectilinear contact surface interface. According to another aspect of the invention, the contact surface interface between the articles is arcuate, and the local magnetic field is applied in such a way as to bend the electron beam as it passes through the contact surface interface so that the articles are welded together over the entire arcuate contact surface interface.

The method of this invention is particularly effective if a relatively deep weld joint is required, such as in situations where the interface to be welded has a length of ten centimeters or more in the direction the electron beam passes through the interface. In accordance with the first aspect of the invention, the method is also particularly effective when electron beam welding articles formed of dissimilar metals, such as stainless and carbon steels.

Other objects and advantages of this invention will be better appreciated from the following detailed description.

DETAILED DESCRIPTION OF THE INVENTION

Figure 1:
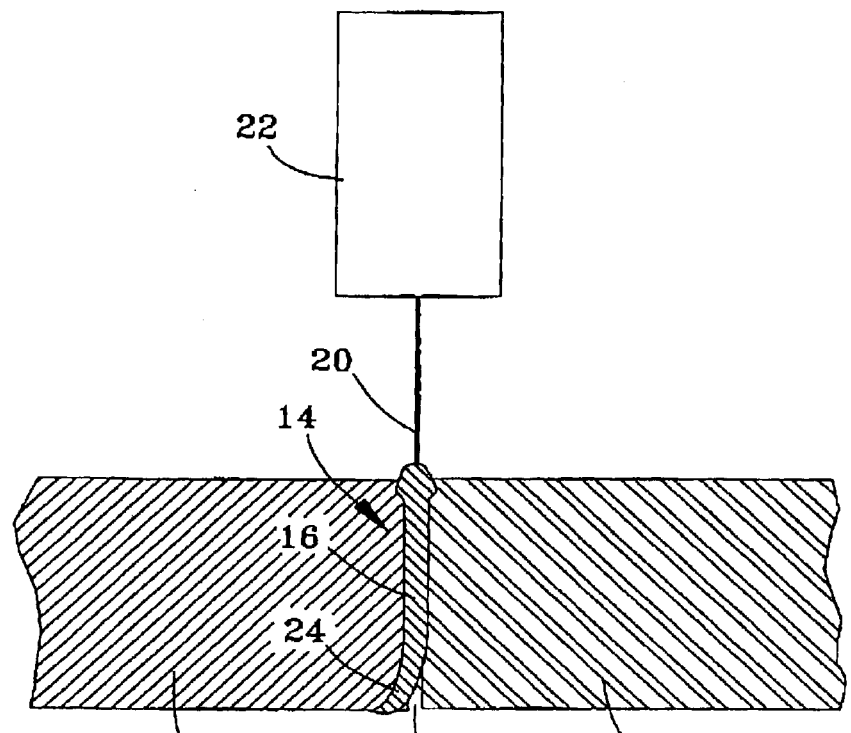
FIG. 1 represents a hooking phenomenon observed when performing deep electron beam welds on articles formed of dissimilar metals.
Figure 2:
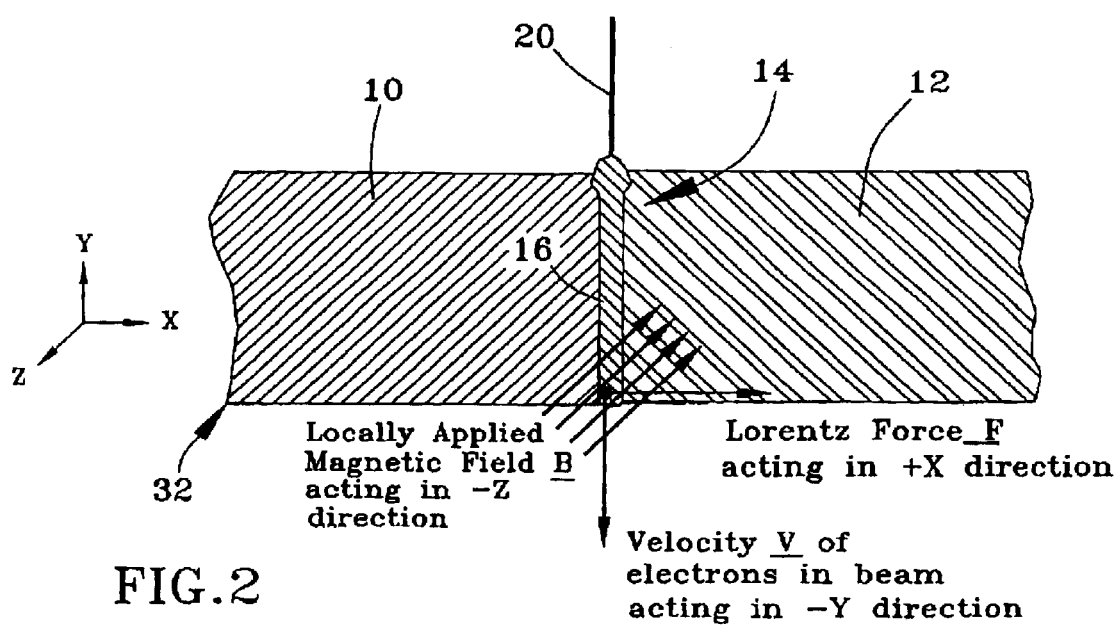
FIG. 2 represents the application of a local magnetic field to produce a Lorentz force that substantially eliminates the beam hook of FIG. 1, so that the beam substantially coincides with a rectilinear surface interface between two articles shown in cross-section.
Figure 3:
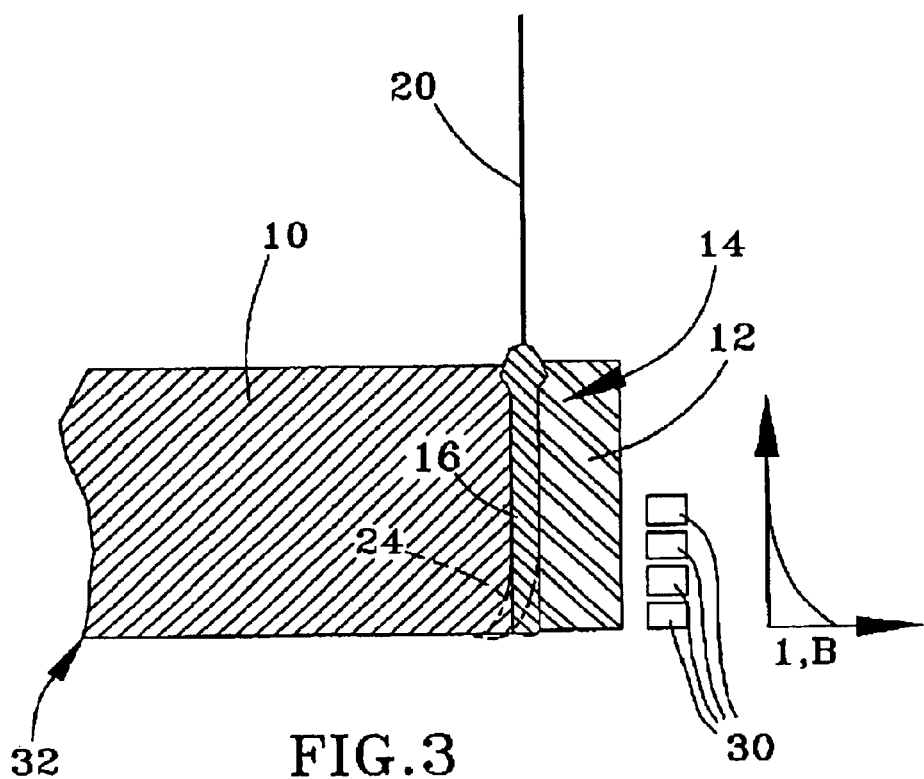
FIG. 3 shows the use of an array of individual coils to generate the local magnetic field of FIG. 2.
Figure 4:
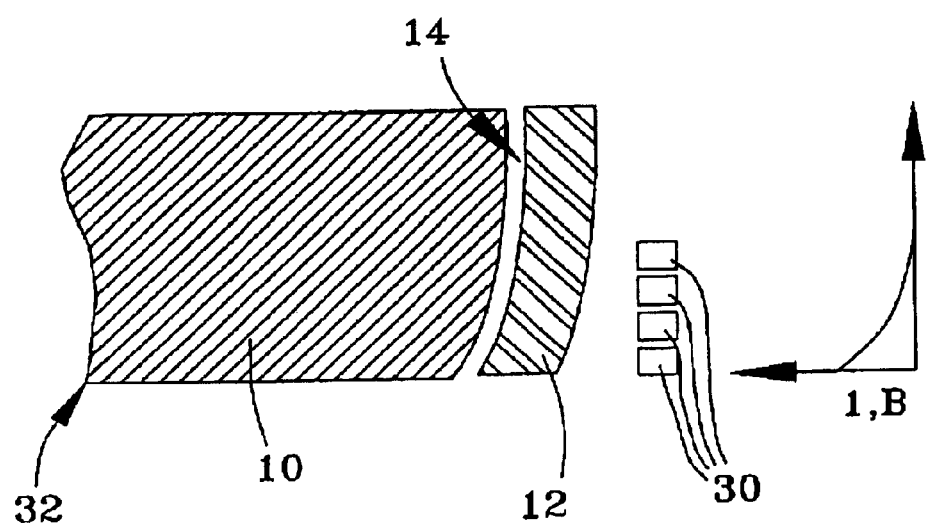
FIG. 4 shows the use of an array of individual coils to generate a local magnetic field to produce a Lorentz force that bends an electron beam, so that the beam substantially coincides with an arcuate surface interface between two articles shown in cross-section.

As depicted in FIGS. 2, 3 and 4, the invention makes use of a magnetic field produced by one or more coils 30 that are oriented to steer an electron beam 20 through an interface 14 formed by opposing surfaces of two components 10 and 12 for the purpose of welding the components 10 and 12 at the interface 14 and thereby form a welded assembly 32. For simplicity, the same reference numbers are used for like elements throughout FIGS. 1 through 4. The components 10 and 12 may be formed of a variety of metal alloys, including steels and superalloys used to form cast turbine components of gas and steam turbines.

In FIGS. 2 and 3, the surface interface 14 is represented as being substantially rectilinear, while in FIG. 4 the surface interface 14 is represented as being arcuate. With respect to the situation represented in FIGS. 2 and 3, the invention finds application when the components 10 and 12 are formed of metals that are dissimilar such that the beam hooking phenomenon occurs, in which the electron beam 20 is deflected away from the interface 14 and into one of the components 10. The result is the hooked portion 24 of a weld represented in phantom in FIG. 3. The hooked portion 24 becomes more evident with increasing depth of the interface 14, particularly for depths of four inches (about ten centimeters) and more. According to a preferred aspect of the invention, the hooked portion 24 is not formed in the weld 16 shown in FIG. 3 as a result of the application of the above-noted magnetic field generated by the coils 30, which are placed adjacent the interface 14 and are oriented to steer the electron beam 20 through the interface 14 such that the beam 20 is straightened.

In FIG. 4, the components 10 and 12 may be formed of dissimilar metals, but their dissimilarity does not necessarily result in the hooking phenomenon. However, the arcuate interface 14 between the components 10 and 12 necessitates that the electron beam 20 must be caused to bend with the interface 14 so that the entire interface 14 is welded. In the turbine industry, there are a number of welded components with potentially applicable geometries that would benefit from being electron beam welded in this manner, such as steam turbine nozzle assemblies (boxes) in which stages of stator airfoils are sealed within rings by a deep axisymmetric EB weld with another ring at the airfoil perimeter. In this situation, the component 10 in FIG. 4 would represent a portion of an airfoil while the component 12 would represent the ring welded to the airfoil. In each case, the components 10 and 12 are welded together over the entire contact surface interface 14, thereby avoiding the formation of a lack-of-fusion defect of the type represented in FIG. 1.

While it should be noted that magnetic coils are ubiquitous in electron beam welding, their use has been confined to the electron beam welder machine itself (e.g., the gun 22 in FIG. 1) to focus the beam 20 (coaxial) or to oscillate the beam 20. In contrast, this invention places one or more coils 30 that generate a magnetic field perpendicular to the beam 20 in close proximity to the interface 14 where the weld 16 is being formed, in order to locally displace the beam 20 as required for the particular situation. The effect of the coil(s) 30 is illustrated in FIG. 2. It is known that a particle with a charge "q" and a velocity "V" moving in a magnetic field "B" will experience a force "F", called the Lorentz force. This force acts perpendicular to both the magnetic field B and the velocity V of the particle. The magnitude and direction of the force are given by the vector product F=qV×B. In reference to FIG. 2, an electron moving in the −Y direction through the magnetic field B that is acting in the −Z direction (i.e., perpendicular to the direction in which the electron beam 20 is passing through the interface 14) will experience a force acting in the +X direction, causing the electron to be deflected from its intended path. In FIG. 3, the coils 30 (in the plane of the page) are depicted, and generate a magnetic field (perpendicular to the plane of the page) which causes the electrons within the electron beam 20 to be deflected to the right as a result of the Lorentz force.

Those skilled in the art will appreciate that the degree to which the electron beam 20 is deflected will depend on the intensity of the beam 20 and the strength of the magnetic field B generated by the one or more coils 30. The deflection of the electron beam 20 passing through the interface 14 can be tailored through the number of coils 30 used, e.g., a single coil 30 or the array of individual coils 30 depicted in FIGS. 3 and 4. If an array of coils 30 is used, each coil 30 can be independently controlled by known control systems to enable "tuning" the array to yield a magnetic field B of appropriate varying strength along the interface 14 in order to properly steer the beam 20 through the interface 14, taking into account the particular circumstances including the particular shape of the interface 14. This tuning effect can be achieved either through trial-and-error or numerical modeling. With respect to the embodiment of FIG. 5, numerical modeling can rely on a numerical model of the components 10 and 12 and the known shape of their arcuate interface 14, such that the coils 30 can be used to shape an electron beam to follow the arcuate path of the interface 14 throughout the thickness of the components 10 and 12.

While the invention has been described in terms of a preferred embodiment, it is apparent that other forms could be adopted by one skilled in the art. Therefore, the scope of the invention is to be limited only by the following claims.

What is claimed is:

1. An electron beam welding method comprising the steps of:

placing together articles to define a contact surface interface therebetween, the contact surface interface comprising first and second portions;

applying a local magnetic field to the second portion of the contact surface interface; and then directing an electron beam at the first portion of the contact surface interface to electron beam weld the articles together at the contact surface interface and thereby form a welded component, the electron beam having a path through the articles that in the absence of the local magnetic field coincides with the first portion of the contact surface region but does not coincide with the second portion of the contact surface interface as the electron beam travels farther through the articles, wherein the local magnetic field steers the electron beam away from a portion of the path to force the electron beam to also coincide with the second portion of the contact surface interface so that the articles axe welded together over the entire contact surface interface.

2. An electron beam welding method according to claim 1, wherein the contact surface interface between the articles is rectilinear, and the local magnetic field straightens the electron beam so that the electron beam lies on a straight path throughout the contact surface interface.

3. An electron beam welding method according to claim 1, wherein the articles are formed of dissimilar metals, and in the absence of the local magnetic field the dissimilar metals would cause the electron beam to be deflected away from the second portion of the contact surface interface and into one of the articles.

4. An electron beam welding method according to claim 1, wherein the second portion of the contact surface interface is arcuate, and the local magnetic field bends the electron beam as it passes through the second portion of the contact surface interface so that the electron beam coincides with the second portion.

5. An electron beam welding method according to claim 1, wherein the local magnetic field is applied by a single magnetic coil placed adjacent the contact surface interface.

6. An electron beam welding method according to claim 1, wherein the local magnetic field is applied by an array of magnetic coils placed adjacent the contact surface interface.

7. An electron beam welding method according to claim 6, wherein each magnetic coil of the array of magnetic coils is independently controlled.

8. An electron beam welding method according to claim 1, wherein the local magnetic field is perpendicular to a direction in which the electron beam passes through the contact surface interface.

9. An electron beam welding method according to claim 1, wherein the contact surface interface has a length of at least ten centimeters in a direction in which the electron beam passes through the contact surface interface.

10. An electron beam welding method according to claim 1, wherein at least one of the articles is formed of a superalloy.

11. An electron beam welding method according to claim 1, wherein each of the articles is formed of a steel.

12. An electron beam welding method according to claim 1, wherein the component is a turbine component.

13. An electron beam welding method according to claim 9, wherein a first of the articles is one of a plurality of turbine stator airfoils, and a second of the articles is a ring.

14. A method of electron beam welding a turbine component, the method comprising the steps of:
 placing together subcomponents of the component to define a rectilinear contact surface interface therebetween comprising first and second portions, the subcomponents being formed of dissimilar metals so that an electron beam directed at and passing through the first portion of the contact surface interface would be deflected away from the second portion of the contact surface interface and into one of the subcomponents;
 applying a local magnetic field to the second portion and not the first portion of the contact surface interface; and then
 projecting an electron beam at the first portion of the contact surface interface to electron beam weld the subcomponents together at the contact surface interface and thereby form the component, wherein the local magnetic field is perpendicular to a direction in which the electron beam passes through the second portion of the contact surface interface and straightens the electron beam as it passes through the contact surface interface so that the electron beam coincides with the second portion of the contact surface interface and the subcomponents are welded together over the entire contact surface interface.

15. An electron beam welding method according to claim 14, wherein the local magnetic field is applied by a single magnetic coil placed adjacent the contact surface interface.

16. An electron beam welding method according to claim 14, wherein the local magnetic field is applied by an array of magnetic coils placed adjacent the contact surface interface.

17. An electron beam welding method according to claim 16, wherein each magnetic coil of the array of magnetic coils is independently controlled.

18. An electron beam welding method according to claim 14, wherein each of the subcomponents is formed of a superalloy.

19. An electron beam welding method according to claim 14, wherein the contact surface interface has a length of at least ten centimeters in the direction that the electron beam passes through the contact surface interface.

20. An electron beam welding method according to claim 14, wherein a first of the subcomponents is one of a plurality of turbine stator airfoils, and a second of the subcomponents is a ring.

21. A method of electron beam welding a turbine component, the method comprising the steps of:
 placing together subcomponents of the component to define an arcuate contact surface interface therebetween comprising first and second portions, wherein an electron beam directed at and passing through the contact surface interface would coincide with the first portion but not the second portion thereof;
 applying a local magnetic field to the second portion and not the first portion of the contact surface interface; and then
 projecting an electron beam at the first portion of the contact surface interface to electron beam weld the subcomponents together at the contact surface interface and thereby form the component, wherein the local magnetic field is bends the electron beam as it passes through the second portion of the contact surface interface so that the electron beam coincides with the second portion and the subcomponents are welded together over the entire contact surface interface.

22. An electron beam welding method according to claim 21, wherein the local magnetic field is applied by a single magnetic coil placed adjacent the contact surface interface.

23. An electron beam welding method according to claim 21, wherein the local magnetic field is applied by an array of magnetic coils placed adjacent the contact surface interface.

24. An electron beam welding method according to claim 23, wherein each magnetic coil of the array of magnetic coils is independently controlled.

25. An electron beam welding method according to claim 21, wherein the contact surface interface has a length of at least ten centimeters in the direction that the electron beam passes through the contact surface interface.

26. An electron beam welding method according to claim 21, wherein each of the subcomponents is formed of a superalloy.

* * * * *